March 18, 1941.　　　C. B. GARWOOD　　　2,235,103
GLASS BOTTLE MACHINE
Filed March 22, 1938　　　6 Sheets-Sheet 1

Charles B. Garwood
INVENTOR.

BY CB Snow & Co.
ATTORNEYS.

March 18, 1941.  C. B. GARWOOD  2,235,103
GLASS BOTTLE MACHINE
Filed March 22, 1938  6 Sheets-Sheet 2

Charles B. Garwood
INVENTOR.
BY *Snow & Co.*
ATTORNEYS.

March 18, 1941.    C. B. GARWOOD    2,235,103
GLASS BOTTLE MACHINE
Filed March 22, 1938    6 Sheets-Sheet 3

Charles B. Garwood
INVENTOR.
BY C. A. Snow & Co.
ATTORNEYS.

March 18, 1941.                C. B. GARWOOD                2,235,103
                            GLASS BOTTLE MACHINE
                           Filed March 22, 1938           6 Sheets-Sheet 4

Charles B. Garwood
INVENTOR.

BY *C. A. Snow & Co.*
ATTORNEYS.

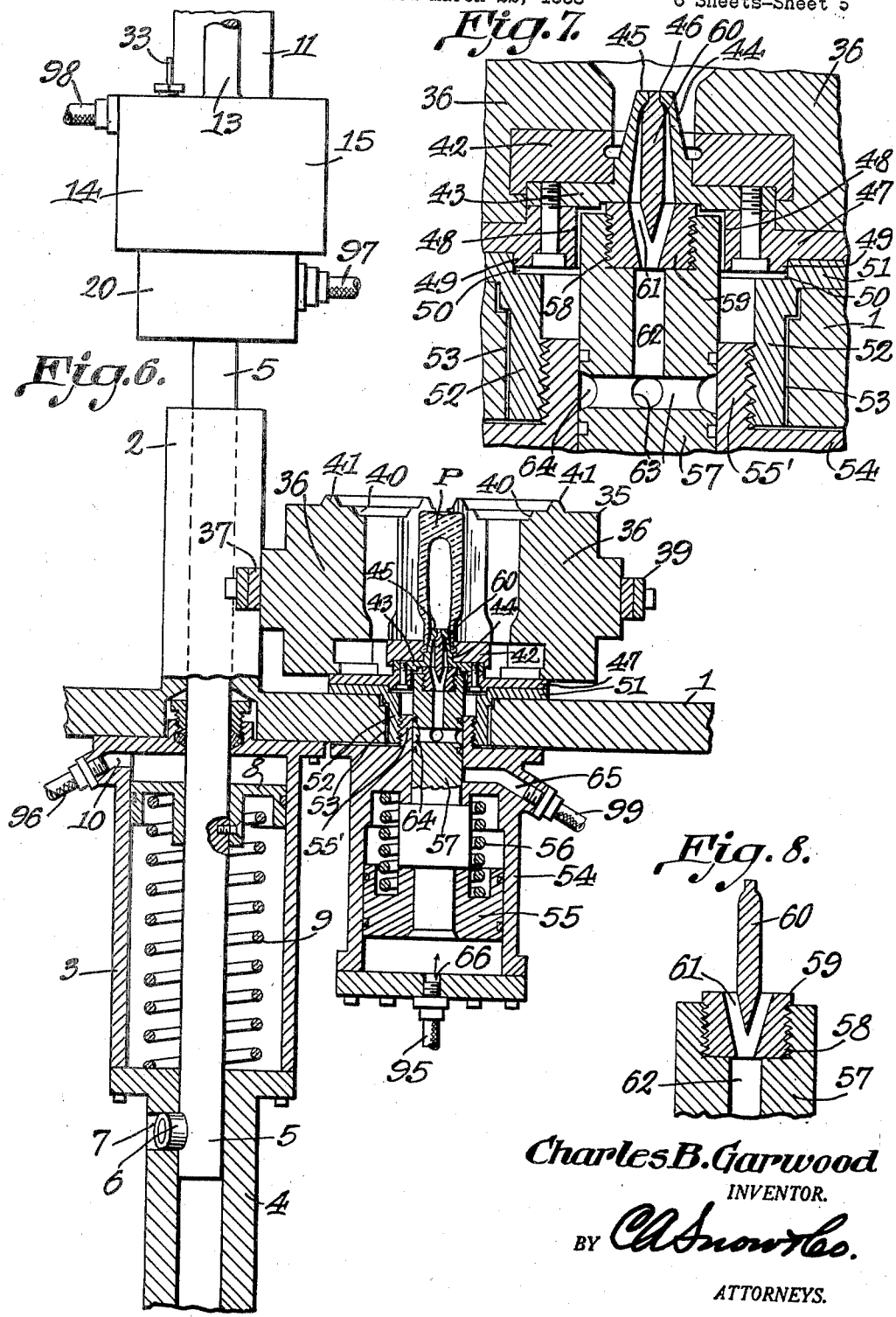
March 18, 1941.  C. B. GARWOOD  2,235,103
GLASS BOTTLE MACHINE
Filed March 22, 1938  6 Sheets-Sheet 5
Charles B. Garwood
INVENTOR.
ATTORNEYS.

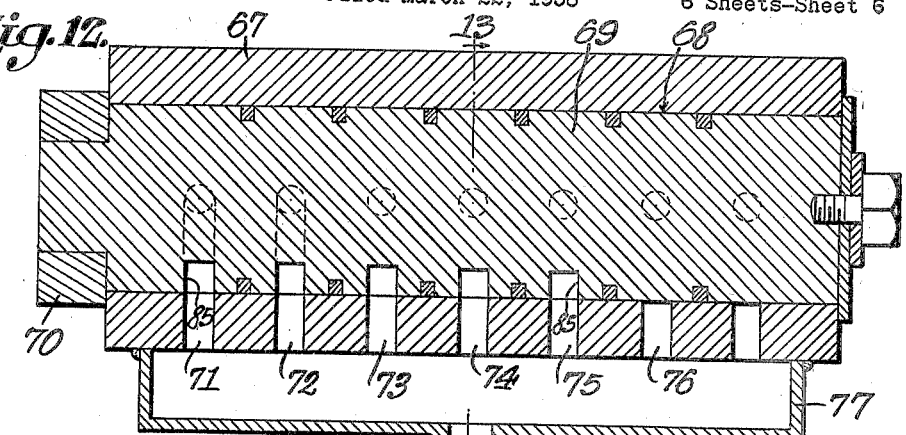
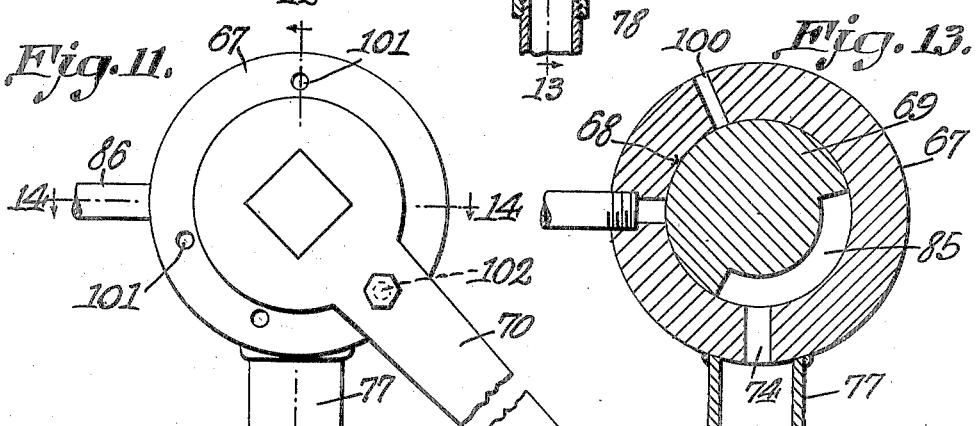
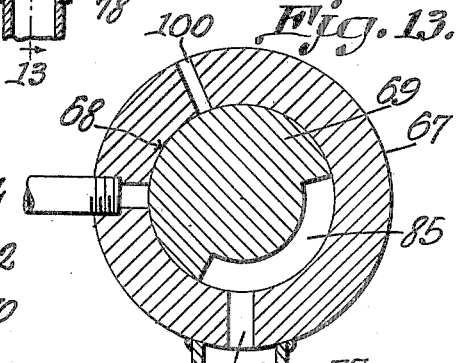
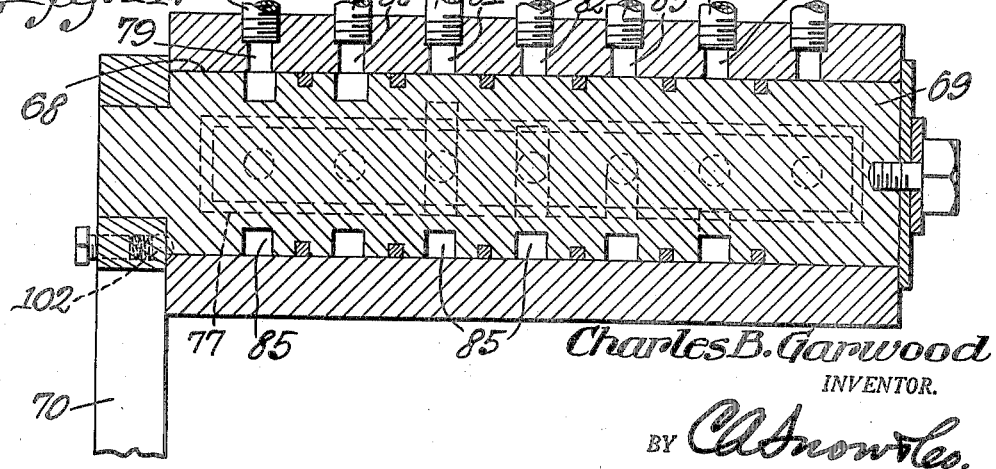

Patented Mar. 18, 1941

2,235,103

UNITED STATES PATENT OFFICE 2,235,103

GLASS BOTTLE MACHINE

Charles B. Garwood, Linthicum Heights, Md., assignor to Carr-Lowrey Glass Co., Baltimore, Md.

Application March 22, 1938, Serial No. 197,516

2 Claims. (Cl. 49—18)

This invention relates to a machine designed primarily for blowing bottles having small necks and while it is designed primarily for hand operation, it can, with certain modifications, be adapted for automatic operation.

An object of the invention is to provide a portable machine adapted to be fed from a pot or tank furnace and capable of high speed production of parisons.

A further object is to provide a machine in which the blank is subjected in rapid succession to a settle blow and a counter blow, these successive actions being so timed that the glass has no opportunity to noticeably chill following the settle blow and, consequently, the completion of the parison is effected without the production of the objectionable settle blow wave which is so pronounced in bottles heretofore produced by the settle blow and counter blow method.

Another object is to provide the machine with a control valve of special construction whereby the successive operations of the machine are effected with any desired rapidity, it being possible for the operator to retard or stop any one of the primary operations at will.

A still further object is to provide a machine utilizing a corkage control plug which is constantly located in the neck of the parison and is utilized for introducing the counter blow air into the parison thereby insuring the formation of a slender bubble and also the retention of more glass in the shoulder portion of the parison and at the base of the neck, than has heretofore been possible.

It is also an object of the invention to provide a means for locating the bubble more accurately and uniformly at the center of the parison whereby a more uniform distribution of glass is effected in the finished bottle.

A further object is to employ a corkage control plug mounted on a floating structure designed to adjust automatically to the expansion and contraction of the blank mold and its holder and thereby insure proper matching of the neck ring and the parison neck joints as well as insuring the proper opening and closing of the blank mold.

Another object is to provide the machine with a combination head of novel construction which not only serves as a baffle plate but also provides the means for directing the settle blow air into the blank mold at the proper time during the cycle of operation.

A still further object is to provide a combination head which is utilized to clamp the top of the blank mold in tightly closed position and indicates at all times the position of the baffle.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 6 is a similar view showing the parts in unloading position.

Figure 7 is an enlarged vertical section through the corkage control plug and adjacent parts all shown in their normal position, as when the machine is being loaded or unloaded.

Figure 8 is a section through the valve cooperating with the corkage control plug.

Figure 11 is an end elevation of the control valve.

Figure 12 is a section on line 12—12, Figure 11.

Figure 13 is a section on line 13—13, Figure 12.

Figure 14 is a section on line 14—14, Figure 11.

Referring to the figures by characters of reference 1 designates a portable table of any preferred size and shape adapted to be moved into position where the blank mold can be fed from a pot or a tank furnace.

Figure 1:
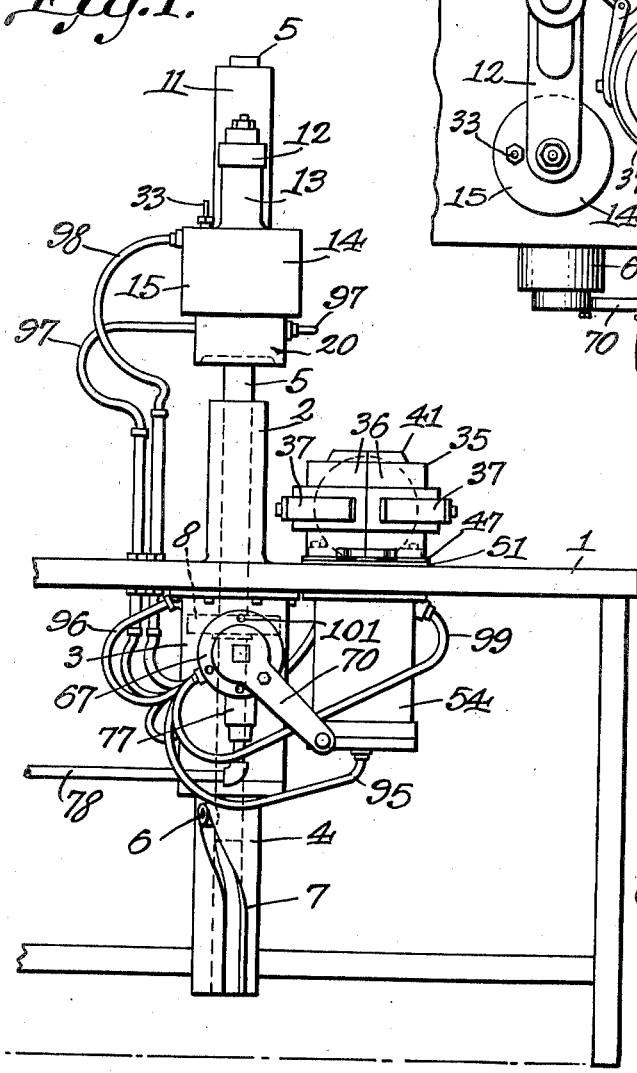
Figure 1 is an elevation of a portion of a portable table on which are mounted the present improvements.

Located on the table 1 is a tubular guide post 2 and depending from the table directly under this post is a cylinder 3 having a depending tubular guide 4. A shank 5 is mounted to slide and rotate within the guides 2 and 4 and is provided, adjacent its lower end, with a projecting portion, such as a roller 6, which is movable within a cam slot 7 in guide 4. The upper portion of this slot is inclined as shown particularly in Figure 1 so that, when the shank 5 is moved downwardly, it rotates a predetermined distance while the guide stud or roller 6 is travelling in the inclined portion of slot 7, after which said guide stud or the like moves downwardly into the vertical or longitudinally extended portion of the slot 7 so that further downward movement of the shank is permitted without rotation.

A piston 8 is secured to shank 5 and works within cylinder 3. This piston is normally supported yieldingly by a spring 9 located in the cylinder. Thus under normal conditions the guide stud 6 or the like is located at the upper end of slot 7. An air inlet port 10 opens into the upper portion of the cylinder so that air admitted to the cylinder under pressure will act to move piston 8 downwardly against spring 9 and cause rotation and sliding movement of the shank 5.

Secured to the upper end portion of shank 5 is a sleeve 11 having an arm 12 to which is secured the stem 13 of the combination head 14 of the machine. This head includes a housing in the form of a cylinder 15 having an air inlet port 16 opening into the top thereof. A guide ring 17 is secured within the lower end of the cylinder and is provided with a central opening 18 about which is arranged an annular series of small apertures or ports 19.

Ring 17 has a cylindrical extension 20 provided with a port 21 and the lower end of this cylindrical extension is flared as shown at 22 for the purpose of surrounding and fitting snugly against the top of the blank mold as hereinafter explained.

A piston 23 is mounted in cylinder 15 and is yieldingly supported by a spring 24 bearing on the ring 17. A stem 25 projects from the center of the piston and is slidable within the central opening 18 in ring 17, this stem and its piston being held against rotation by any suitable means, such as a key or feather 26.

Figure 3:
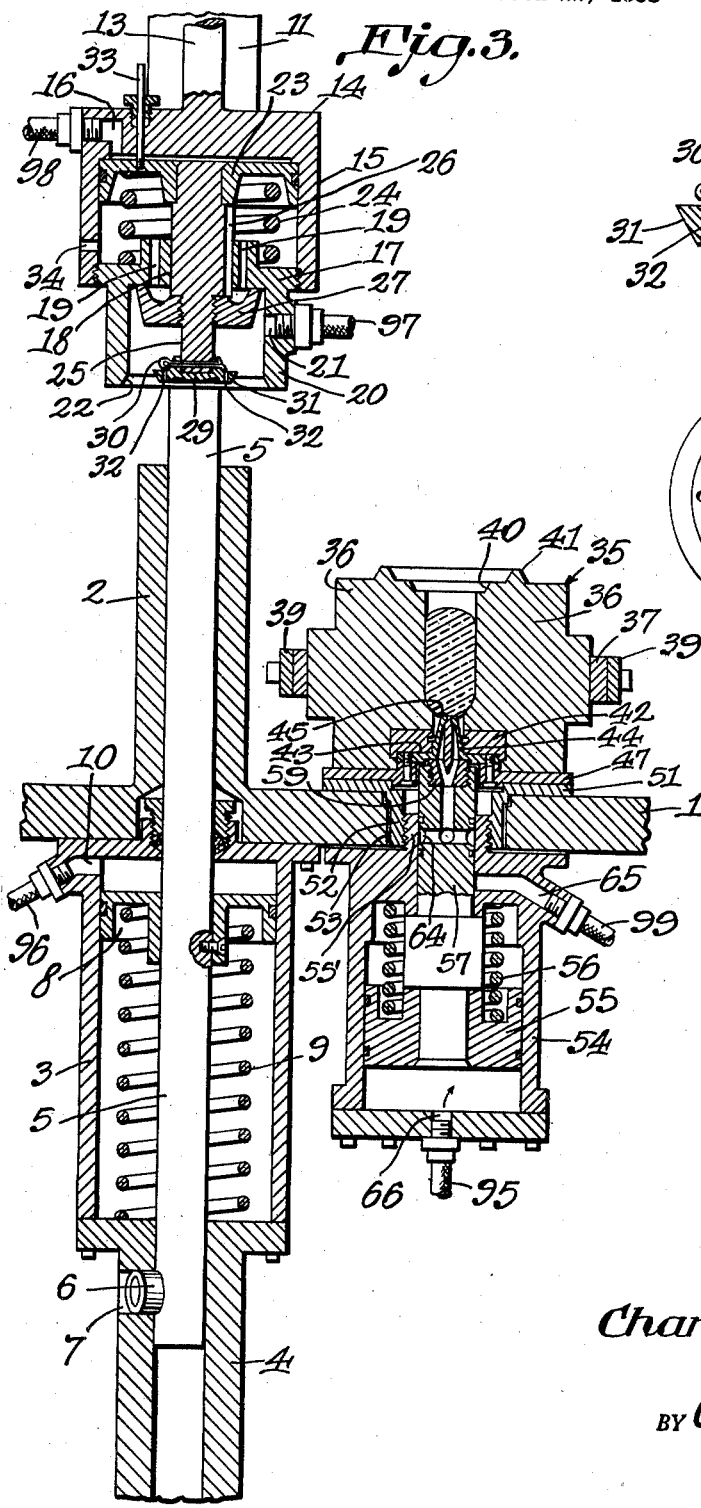
Figure 3 is an enlarged vertical section taken through a portion of the apparatus and showing the parts in loading position, the glass gob being shown in the blank mold immediately prior to the application of the head which, as shown at the left of said figure, is in elevated and retracted position.
Figure 5:
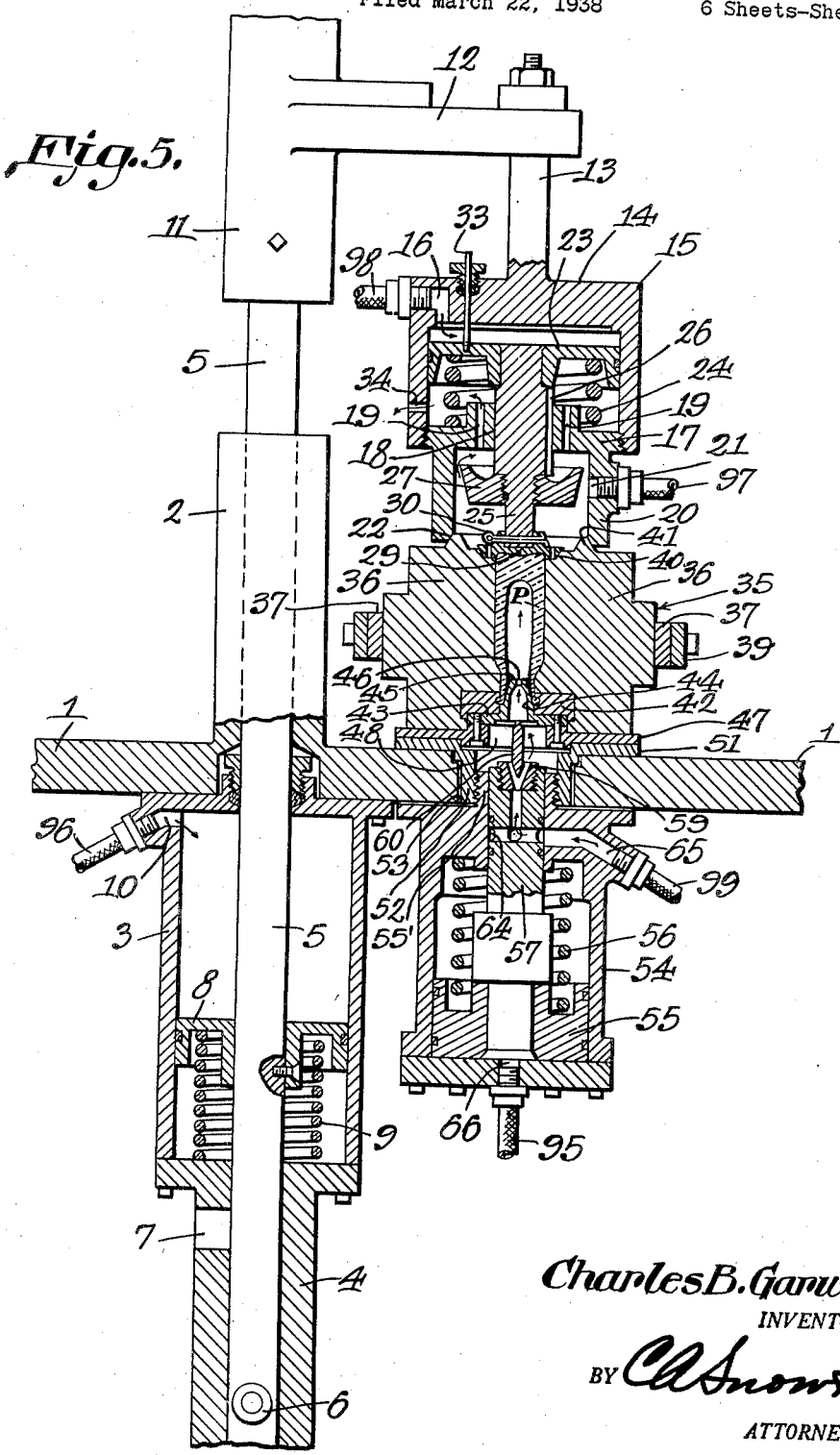
Figure 5 is a view similar to Figure 4 showing the parts in counter blow position.

A disk valve 27 is secured to and moves with stem 25 and, when in normal or raised position, as in Figure 3, this valve bears snugly against the ring 17 which thus forms a seat and prevents the flow of air through the ports 19. The disk valve 27 is spaced at all times from the wall of cylinder 20 so that air is free to flow therearound when the valve is open, as shown in Figure 5.

Figure 9:
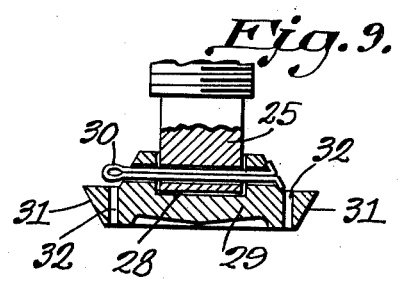
Figure 9 is an enlarged section through the baffle plate and adjacent parts.

Stem 25 projects below valve 27 and as shown clearly in Figure 9, the end of the stem is seated loosely in a pocket 28 formed in the top of a baffle plate 29. This plate is held to the stem 25 preferably by a removable pin 30. A slight relative movement between the plate and the stem 25 is permitted.

Figure 10:
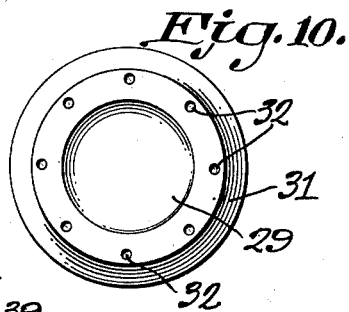
Figure 10 is a bottom plan view thereof.
Figure 4:
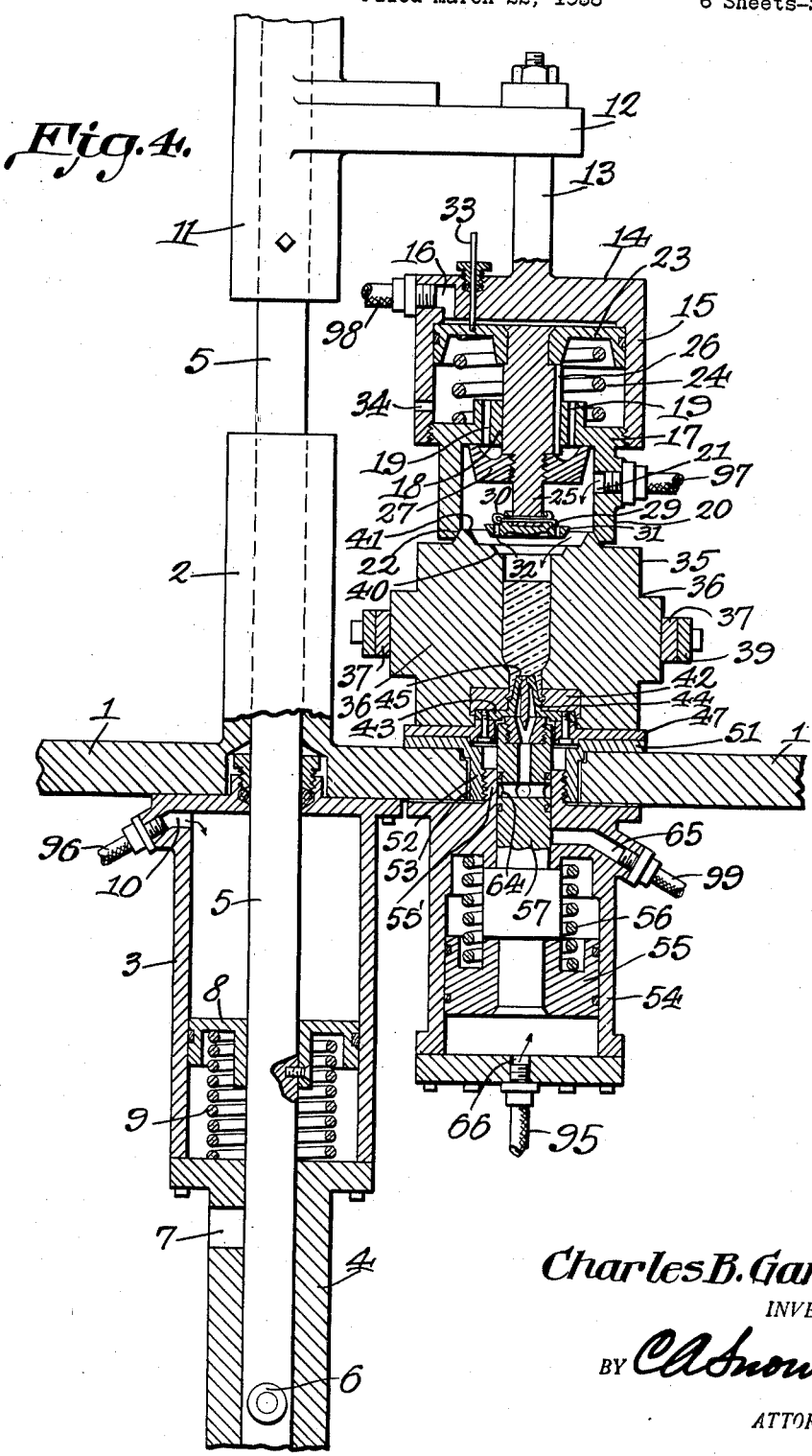
Figure 4 is a view similar to Figure 3 but showing the parts in settle blow position.

Plate 29 is preferably formed with a tapered wall as shown at 31 so that it can thus wedge tightly onto the tapered seat provided therefor in the blank mold, as hereinafter explained. The bottom of the baffle plate 29 is shaped to give the finished blank any desired contour where it contacts therewith and formed in the plate adjacent to its periphery are ports 32 arranged in an annular series as shown for example in Figure 10.

Secured to the piston 23 is a pin 33 which is slidable within the top of head 14. This pin constitutes an indicator whereby the operator can determine at any time the exact position of the piston 23 and the baffle plate coupled thereto. Formed in the wall of the cylinder 15 between piston 23 and ring 17 is an outlet port 34.

The blank mold has been indicated generally at 35 and, like the usual molds of this type, is made up of opposed sections 36 carried by holders 37 hingedly connected as at 38 and provided with arms 39. The members 36 of the blank mold cooperate at their upper ends to provide a tapered seat 40 for the baffle plate when the mold is closed and upstanding from the members and concentric with this seat are tapered ribs 41 which cooperate to provide a circular seat for the flared portion 22 of the cylindrical extension 20. This blank mold is so located that when it is closed, it will be in axial alinement with the baffle plate 29 while in one extreme position.

The blank mold is provided with the usual neck ring indicated at 42 and this neck ring is adapted to close about the flat circular base 43 of an upwardly tapered hollow corkage plug 44 designed to project into the neck portion of the blank mold and to close the bottom portion of the opening within the neck ring 42. These relative positions of the parts have been indicated in Figure 7. The corkage plug has a flat end 45 with a central opening 46 and the base disk 43 of the corkage plug bears upon and is fixedly attached to a bearing plate 47 having a central opening 48 extending therethrough. An annular shoulder 49 extends downwardly from the bearing plate 47 and is concentric with the opening 48 and the longitudinal axis of the corkage plug 44. This shoulder is adapted to be seated snugly within a recess 50 formed in the top portion of a supporting plate 51 which bears on the table 1 and has a sleeve 52 extending downwardly therefrom. An opening 53 of slightly greater diameter than sleeve 52 is provided in the table 1 so that the sleeve and the parts carried thereby are thus free to have a slight movement horizontally within the opening.

Located below the table 1 and slightly spaced therefrom is a cylinder 54 having a tubular extension 55' projecting upwardly from the center thereof and detachably seated in the sleeve 52. Thus it will be seen that the cylinder as well as the plate 51 and sleeve 52, is capable of a slight radial movement in any direction relative to the table 1.

A piston 55 is mounted in cylinder 54 and is normally pressed downwardly by a spring 56 located in the cylinder. This piston has a stem 57 fitted snugly in the upper end of the cylinder and also within the extension 55' and the upper end of the stem has a threaded recess 58 in which is seated a screw plug 59 carrying a valve 60 in the form of a pin so shaped as to normally seat tightly in the opening 46. This pin, when in normal position, does not fit against the wall of the corkage control plug 44 but is spaced therefrom as shown in Figure 7, thereby permitting air to flow around the pin freely to the opening 46 when the pin is unseated.

An air passage is extended through the screw plug 59 as indicated at 61, this passage preferably being forked so that air will flow to opposite sides of the pin or valve 60. Passage 61 opens into a passage 62 extending through the upper portion of stem 57 and communicating through radial passages 63 with an annular groove 64 formed in the stem. When the piston 55 is in raised position and the pin or valve 60 is closing opening 46, the annular groove 64 is closed by the wall of the threaded extensions 55' on cylinder 54 but when piston 55 is moved downwardly and the pin or valve 60 is shifted to open position, this annular groove 64 will be brought into register with a port 65 provided in the upper head of cylinder 54.

A port 66 is provided in the bottom of the cylinder for the purpose of admitting air under pressure against piston 55 to thrust said piston against the action of spring 56 and to maintain the valve 60 in closed position.

Figure 2:
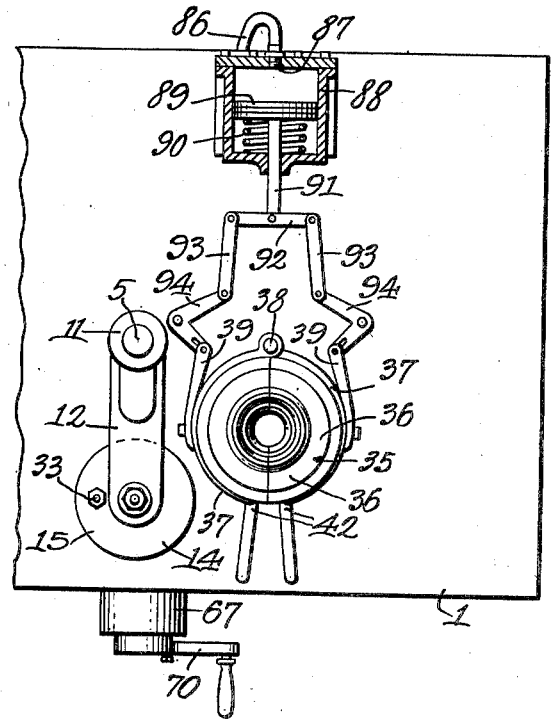
Figure 2 is a plan view thereof, the cylinder of the mold-operating mechanism being shown in section.

The working parts of the machine are all under the control of a valve which is carried by the table and can be operated by the operator. As shown in Figures 11 to 14 inclusive this valve includes a casing 67 having a bore 68 in which a valve 69 is fitted snugly and mounted for rotation, this valve, in the structure shown, being operated by means of a handle 70 at one end thereof. The valve casing has a series of inlet ports indicated at 71, 72, 73, 74, 75, and 76 respectively, these ports all being in communication with a header 77 to which air under pressure is constantly supplied from any suitable source through a pipe 78. Associated with these inlet ports are outlet ports indicated at 79, 80, 81, 82, 83, and 84 respectively. The periphery of the valve is formed with recesses 85 extending therearound for the purpose of establishing communication between the respective inlet and outlet ports in proper succession and for predetermined time intervals. Thus during one complete rotation of the valve 69, air under pressure will be admitted to the outlet ports for the purpose of producing, at the proper time and for the correct time intervals, the operation essential to the formation of a blank. It is to be understood that the valve shown is not necessarily of the exact type which will be used because any hand-operated valve capable of directing air under pressure into different channels in proper succession and for proper time periods could be employed. In the structure illustrated, however, the outlet ports are connected to the respective operative parts of the machine as follows:

Port 79 is connected by a flexible pipe 86 to the port 87 in a cylinder 88 which, as shown particularly in Figure 2, contains a piston 89 normally pressed toward the port 87 by a spring 90. The stem 91 of this piston has a head 92 connected by links 93 to bell cranks 94 which, in turn, are pivotally joined to the arms 39 on the holders 37. Thus under normal conditions the spring 90 holds piston 89 pressed toward port 87 so that the lever and link connections will hold the blank mold members 36 swung open for the purpose of delivering a formed blank. However when air under pressure is admitted through pipe 86 to cylinder 88, piston 89 will be shifted to quickly close the blank mold and to maintain it closed during the shaping of the parison until the parison is ready for delivery.

Port 80 of the valve can be connected by a flexible pipe 95 to the port 66 in the bottom of cylinder 54 and port 81 can be connected by a flexible pipe 96 to port 10 in the cylinder 3. A flexible pipe 97 extending from port 82 can be connected to port 21 in the combination head and another flexible pipe 98 can lead from port 83 to port 16. A pipe 99 connects port 84 to port 65.

It is to be understood that additional ports and pipe connections can be provided if desired for the purpose of producing other operations during the rotation of the valve.

Normally the combination head is raised above the table and is located above and at one side of the blank mold, as shown in Figure 2, the blank mold, however, being open so that the formed parison can thus be lifted from the mold and transferred to the blow mold. After the neck ring has been replaced about the corkage control plug following the removal of the parison, the machine is ready to go through the cycle of operation, as follows:

The operator begins to rotate valve 69. This causes air under pressure to enter cylinder 88 and close the blank mold. The mold is held closed until the valve completes its rotation at which time the pressure is released through a suitably located port such as the one indicated at 100 in Figure 13 and spring 90 is permitted to open the mold to allow removal of the parison.

Following the closing of the mold as before explained, air is admitted under pressure to the bottom of piston 55, thereby raising the valve 60 so as to close the opening in the corkage control plug, said piston being moved from the position shown in Figure 5 to the position shown in Figure 3. The charge of glass is then dropped into the mold and as the valve continues to rotate air under pressure is admitted to port 10 which causes shank 5 to move downwardly from its normal position and to swing the combination head around so as to overlie the mold. On reaching this position said head promptly descends onto the mold so that the flared lower end 22 will engage ribs 41 and fasten the mold in closed position. As soon as the head is thus seated on the mold, air under pressure is admitted to the head through port 21 and is delivered downwardly around the baffle plate 29 so as to subject the glass to the action of this settle blow, thereby causing it to pack around the corkage control plug and to fill the lower portion of the mold. Immediately following the admission of air under pressure through port 21, air is admitted to the head through port 16 and forces piston 23 downwardly. This causes the baffle plate 29 to engage seat 40 and at the same time valve 27 opens port 19 so that air admitted through port 21 can exhaust through port 19 to outlet 34. Simultaneously with the seating of the baffle plate 29, the pressure pipe 95 is opened to its exhaust which can be a suitably located port such as shown at 100 and spring 56 snaps the piston 55 downwardly to withdraw pin or valve 60 from opening 46 and place the passages 64, 63, 62 and 61 in communication with port 65. Thus air will be forced into the glass and form a long slender bubble, at the same time equally distributing the glass throughout the length of the cavity in the mold and against the baffle plate and releasing it from contact with the small end of the corkage control plug as shown in Figures 5 and 6 to complete the parison P.

Following the foregoing operations the supply of air to port 65 is cut off, air is permitted to exhaust through port 10, valve 60 is elevated to normal position by the admission of air under pressure from pipe 95, and shank 5 is raised and rotated so as to return the combination head to its initial position. As soon as the head becomes disengaged from the blank mold, the mold is opened as heretofore explained, the formed parison removed, and the machine then is ready to repeat the cycle of operations already described.

It has been found in actual practice that the machine herein described is especially useful for the production at high speed of small bottles having slender necks which heretofore have been made satisfactorily by hand only. The rotating valve maintains the mechanism constantly under absolute control and the speed of production will be limited solely by the speed with which the finished parison can be removed and new charges placed in the molds.

Because of the rapid succession with which the settle blow and counter blow operations take place, the glass after being subjected to the settle blow, does not have an opportunity to be chilled by the wall of the mold before it is subjected to the counter blow. Therefore the objectionable settle blow waves which heretofore have been produced in bottles made by the settle blow and counter blow process, are eliminated entirely from the parisons and a better product thus produced than heretofore has been possible by the use of any machine. The special corkage control plug with the valve therein permits a quick reversal from settle blow to counter blow because when the glass is subjected to the settle blow action, the neck portion of the parison is quickly chilled by the corkage control plug so that it will not become distorted when the glass is subjected to the counter blow. This corkage control plug also insures accurate location of the long slender bubble in the parison and produces a uniform distribution of the glass, so that the shoulder of the parison and the base of the neck will not be weakened as frequently happens when other methods are followed.

By mounting the corkage control plug on a floating cylinder, these parts will adjust themselves automatically to the expansion and contraction of the blank mold and its holder and insure proper matching of the neck ring and parison neck joints as well as the proper opening and closing of the blank mold.

Obviously the valve can be marked so that the operator can ascertain at all times its position in the cycle of operation. This indication can be effected advantageously by providing depressions 101 at different points in the end of the valve casing and by having a spring-pressed ball 102 in the handle 70 adapted to snap into these depressions successively. By providing a depression to indicate settle blow position, another depression to indicate counter blow position, a third depression to indicate unloading position, and a fourth depression to indicate loading position, the operator, simply by the "feel" of the handle, can determine the position of the valve. Thus the operator can pause or accelerate at any of these points if found desirable.

As has heretofore been stated the machine permits the application of the counter blow immediately following the application of the settle blow because the neck portion of the parison will not become distorted. This is due to the fact that this neck portion is immediately chilled by contact with the adjacent portion of the mold and neck ring and because of contact with the hollow corkage control plug which, obviously, is cooled by the contact of air therewith.

Importance is attached to the advantage in the present invention over the common practice wherein, after the settle blow has forced the glass into the neck ring and around the corkage plug, the entire plug is lowered and air is introduced for the counter blow. It can be readily seen that under these conditions the air pressure is in contact with a large area of glass and, pushing it ahead of it, sweeps more glass out of the neck than is desired unless the operation is slowed down and if it is slowed down, the settle blow wave is more pronounced. However with the corkage control plug herein described, the counter blow air is introduced into the neck at a point farther in the neck and over a small area which has the effect of loosening the glass around the end of the plug without moving it out of the neck, and this allows a rapid change from settle blow to counter blow without a pause.

What is claimed is:

1. In a glass machine a mold having a cavity with a feed opening at one end, and a head mounted for movement onto the mold and into position about the opening, said head including a cylinder, a ring fixed in one end of the cylinder, a cylindrical extension on the ring, a piston in the cylinder, a stem extending therefrom and slidable in the ring, a baffle plate carried by the stem, yielding means within the cylinder for normally supporting the piston and holding the baffle plate normally outside the cavity and away from the feed opening, means for directing air under pressure into the extension and through the feed opening to effect a settle blow within the mold, and means for directing air under pressure into the cylinder and against the piston, said piston, when actuated constituting means for moving the baffle in the direction of air flow into the feed opening, said head having an exhaust port, there being a port extending through the ring, and a valve movable with the stem and in the extension, said valve being held by the stem normally in port-closing position against the ring.

2. In a glass machine a mold having a cavity with a feed opening, and a head mounted for movement against the mold and about the opening, said head including a cylinder and said head having spaced air intake ports, a piston in the cylinder between the ports, a baffle movable with the piston, yielding means for normally holding the piston in one extreme position and the baffle normally outside the cavity and away from the feed opening, there being communicating exhaust ports in the head between the piston and feed opening, a valve for one exhaust port movable with the piston, said valve being normally closed, means for momentarily directing air under pressure to one intake port and against the piston to move the baffle into the feed opening and to open the valve, and means for directing air under pressure to the other intake port, when the baffle is unseated and the valve is seated, and into the feed opening to effect a settle blow within the mold.

CHARLES B. GARWOOD.